INVENTORS:
Hermann Kittel
Willi Kohmann
Bernhard Kasper by: Michael S. Striker
Attorney INVENTORS:
Hermann Kittel
Willi Kohmann
Bernhard Kasper by: Michael S. Striker
Attorney Sept. 22, 1964 H. KITTEL ET AL 3,149,779
ZERO SUPPRESSION MEANS FOR PUNCH MECHANISM
CONTROLLED BY PIN CARRIAGE POSITION
Filed Dec. 19, 1960
6 Sheets-Sheet 3

INVENTORS
Hermann Kittel
Willi Kolmann
Bernhard Kasper
by: Michael S. Striker
Atty Sept. 22, 1964 H. KITTEL ET AL 3,149,779

ZERO SUPPRESSION MEANS FOR PUNCH MECHANISM CONTROLLED BY PIN CARRIAGE POSITION

Filed Dec. 19, 1960 6 Sheets-Sheet 4

INVENTORS
Hermann Kittel
Willi Kollmann
Bernhard Kasper
by: Michael S. Striker
Atty INVENTORS:
Hermann Kittel
Willi Kohmann
Bernhard Kasper
by:
Richard S. Striker
Attorney INVENTORS
Hermann Kittel
Willi Kollmann
Bernhard Kasper
by: Michael S. Striker
Atty

United States Patent Office 3,149,779

Patented Sept. 22, 1964

3,149,779
ZERO SUPPRESSION MEANS FOR PUNCH MECHANISM CONTROLLED BY PIN CARRIAGE POSITION

Hermann Kittel, Willi Kohmann, and Bernhard Kasper, all of Villingen, Black Forest, Germany, assignors to Kienzle Apparate G.m.b.H., Villingen, Black Forest, Germany Filed Dec. 19, 1960, Ser. No. 76,615
Claims priority, application Germany Dec. 18, 1959
18 Claims. (Cl. 235—60.25)

The present invention relates to a control arrangement for preventing undesired recording in an accounting machine, more particularly to an arrangement by which the punching of zero marks on a card is prevented during an operational cycle of the machine during which no numerical value has been introduced.

In conventional accounting machines, multi-order numbers are introduced into a pin carriage, printed on a record sheet and also recorded on a card by a punching operation. The cards to be punched are fed to the punches in synchronism with the movements of the paper carriage of the accounting machine on which the record sheet is located.

Since a recording operation is automatically performed during each operational cycle of the machine, that is also during each movement of the main or paper carriage, and since the pin carriage of the machine is normally in a position representing zero, a set of zero records or markings is produced on the card whenever the machine goes through an operational cycle without the introduction of a number in the pin carriage. This results in occasional errors in the evaluation of the cards marked by punching particularly if the debit and credit amounts are entered on the record sheet on the paper carriage in separate columns, but are marked or recorded on the punched card in only one field.

Assuming that the operator of the accounting machine intended to skip a column, for example the credit column, but that the paper carriage with the record sheet has stopped at this column. In this event, the card to be marked by punching is in its correct position, but the paper carriage is not since a debit value is to be entered in the corresponding debit column of the record sheet on the paper carriage.

In order to obtain a tabulating movement of the paper carriage to the next following desired credit column, the operator may actuate the motor key of the machine so that an operational cycle of the machine is started during which the credit column of the record sheet is not printed, since no value was introduced into the pin carriage, but during which the card was marked in the field common to credit and debit by a series of zero recordings.

When during the following cycle of the machine, a numerical value is introduced into the pin carriage, printed on the record sheet in the credit column, and punched into the card, the records representing the numerical value are punched into the same field in which already zero marks were punched during the preceding idle cycle of the machine.

In this manner, an improperly recorded card is produced, which later on may cause errors by incorrect interpretation.

It is one object of the present invention to overcome this disadvantage of accounting machines, and to provide a control arrangement for preventing undesired marking or recording operations in an accounting machine.

Another object of the present invention is to prevent the punching of zero marks during an operational cycle of the accounting machine in which no numerical value is introduced.

Another object of the present invention is to provide a control arrangement for an accounting machine in which subsequent recordings in the same field of a punch card are prevented.

Another object of the present invention is to provide a control arrangement for an accounting machine assuring a foolproof operation.

A further object of the present invention is to provide a control arrangement of simple and efficient mechanical or electrical construction for preventing undesired zero recording operations in an accounting machine.

With these objects in view, one embodiment of the present invention comprises recording or marking means for marking a record carrier, such as a punched card; cyclically operating drive means for effecting recording or marking operations of the marking means, preferably including a clutch connecting the marking means to a drive motor, and operated by a cam performing a revolution during each cycle of the accounting machine; connecting means connecting the cyclically operating drive means with the recording means and being movable between an inoperative position, and an operating position for causing a recording operation; and a pin carriage having an initial zero position and shifting the connecting means to the inoperative position during each cycle of the machine in which the pin carriage is in the initial position.

In the event that the value is introduced into the pin carriage, the carriage moves out of its initial position to a different position for representing the respective introduced numerical value. In such displaced position, the pin carriage does not engage the connecting means, and does not shift the same to the inoperative position in which no recording operation is effected during the respective operational cycle of the machine.

Consequently, introduced numbers are recorded on a record carrier card, while during operational cycles of the machine started only for the purpose of moving the paper carriage, no zeros are recorded on the record carrier card.

In one embodiment of the present invention the connecting means include coupling means movable between an inoperative position and an operative coupling position, biasing means for biasing the coupling means to move to the inoperative position, and blocking means having an inoperative position and a normal blocking position for blocking movement of the coupling means to the inoperative position. The pin carriage engages an operating member of the blocking means during each operational cycle in which the pin carriage remains in its initial zero position, and shifts the blocking means to the inoperative position so that the coupling means moves to the inoperative position thereof whereby the recording means cannot be operated during an idle operational cycle of the machine.

In another embodiment of the present invention, an electromagnetic means operates the clutch of the drive means and is energized by a circuit including a control switch operated by a control cam means, and a blocking switch connected in series with the control switch and being normally in a closed position. The pin carriage moving transversely to a displaced position during each cycle of the machine, causes movement of the blocking switch to its open position only in its initial position so that the circuit is interrupted, and the recording means is not operated during a cycle of the machine in which no value is introduced into the pin carriage. However, if a value is introduced, the pin carriage moves out of its initial position so that it cannot engage the blocking switch to open the same during transverse movement, and consequently, the circuit remains closed, and the recording means are operated to punch records representing the respective introduced numerical value into the record carrier card. This circuit advantageously includes another switch operated by a control tab on the paper carriage of the accounting machine.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawings, in which:

Figure 1A:
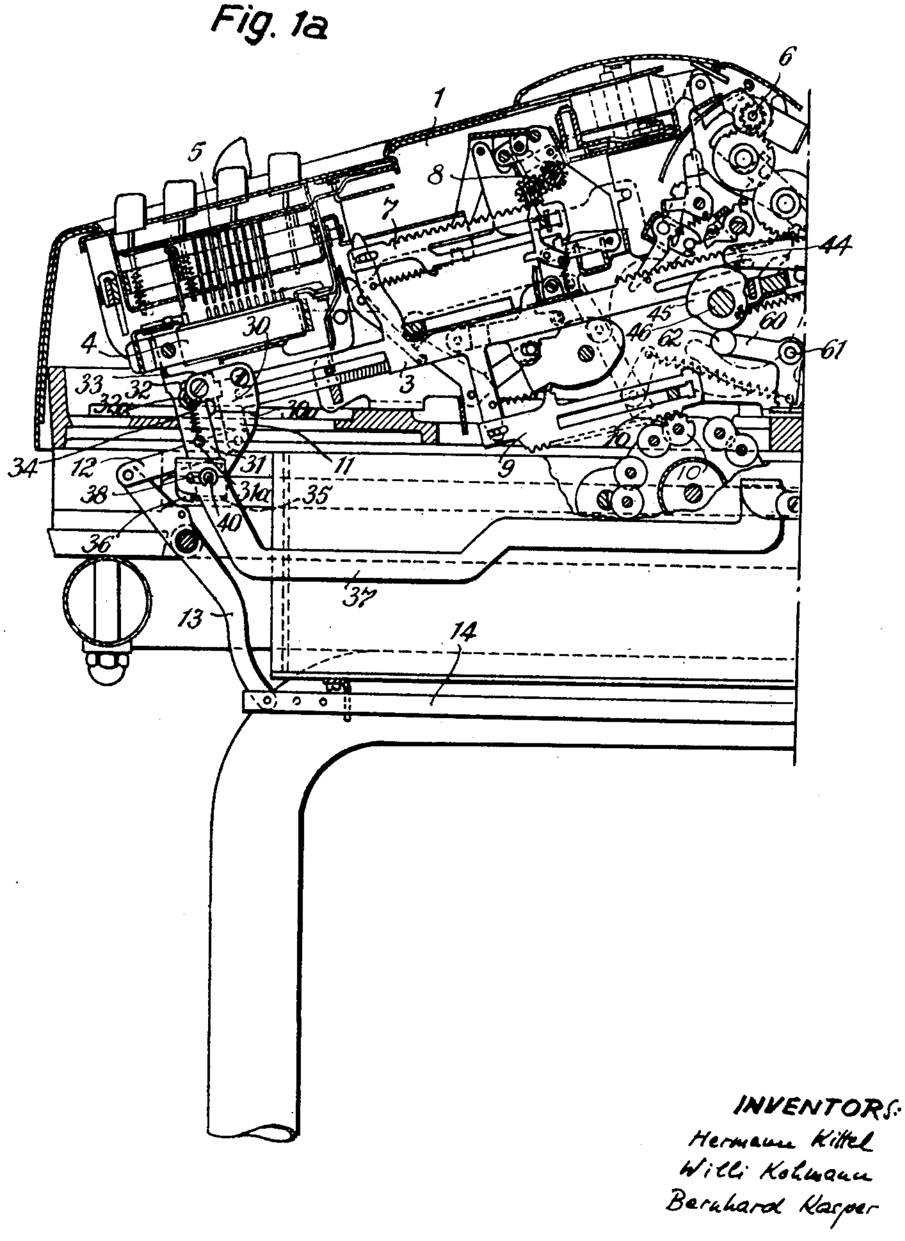
FIG. 1 is divided into FIGS. 1*a* and 1*b* and is a cross sectional view illustrating an accounting machine with an attached recording apparatus for cards and provided with a control arrangement according to one embodiment of the present invention, the control arrangement being shown in heavier lines in an initial normal position.

Referring now to the drawings, and more particularly to FIGS. 1*a* to 3*b*, the accounting machine 1 has a main or paper carriage 2 with a platen roll 2*a* on which a record sheet may be held. A pin carriage 4 cooperates with a keyboard 5 in the manner of a conventional ten-key calculator. Whenever a numerical value is introduced into the pin carirage 4 it performs one step to the left as viewed in FIG. 4 and assumes, for example, the displaced position 4′ shown in broken lines in FIG. 4. The pin carriage also performs an up and down movement during each operational cycle of the machine, and each value represented in the pin carriage by displaced pins is sensed by differential slide elements 3, so that the position of each slide element 3 represents a digit in the decimal order with which the respective slide element 3 is associated. The up and down movement of the pin carriage takes place during the first half of the cycle of the machine so that after initiation of the cycle, no further digit can be introduced into the pin carriage. In the lowest position in which the pin carriage rests for a short time until all slides have reached their operational end position representing the numerical value introduced in each order, the pins cannot be reached and actuated by the keys. As is well known, the slides or rack bars are locked in their end positions until the end of the cycle is reached, so that the pin carriage can return to its initial position. The mechanism performing the up and down movement may be constructed as shown in our U.S. Patent No. 2,708,550. Slide elements 3 have rack portions meshing with gear means through which the printing means 6 in the respective order is set to a corresponding position for printing the respective digit on a record sheet held on platen 2*a*. Another set of rack bars 7 is connected to the slide elements 3, and mesh with gears 8 which control a totalizer for performing computing operations. Another set of rack bars 9 is connected to the slide element 3, and controls gear means acting on a storage register 10.

Each slide 3 has a transverse portion 11 articulated to links 12 which are pivotally connected to double-armed levers 13 through which connecting bars 14 are shifted. Each connecting bar 14 is connected to a rack bar 15 which turns through gears a printing means 17 to a position for printing the digit represented in the respective order of the pin carriage.

Each rack bar 15 carries a coupling member 18 which is spring loaded by a leaf spring 18′ to assume a raised position.

A row of punches 21 is arranged underneath each bar 15 so that a row of punches is provided for each decimal order. FIG. 1*b* shows a member 18 in a position above a punch associated with the value zero, since slides 3 are in the initial zero position. When slides 3 are displaced, member 18 in each order is also displaced and assumes a position located above the punch representing the digit introduced in the respective order of the pin carriage.

A U-shaped operating member 19 extends across all bars 15 and has legs 19′ which are pivotally supported. A slide member 20 is guided for selective movement in a direction transverse with respect to bars 15 on rollers 20*a* on member 19 in order to actuate a certain number of punches selected corresponding to the number of decimal orders to be registered. The position of member 20 is defined by the control bridge 23. The operational connection between the control bridge 23 on the paper carriage and slide member 20, and its control function, are described in the U.S. Patent 3,034,426. Eccentric members 119 on a shaft 152 are connected to the legs 19′ of member 19 so that during rotation of shaft 152, member 19, 20 is lowered and presses members 18 against the action of springs 18′ against the respective punches 21 to effect punching of a card located under the punches 21. Another member moving with member 19, 20 and extending in axial direction of the turnable printing means 17 presses the same down and onto the card. Each card is fed under the punches and printing means during each operational cycle of the machine.

Figures 4, 7:
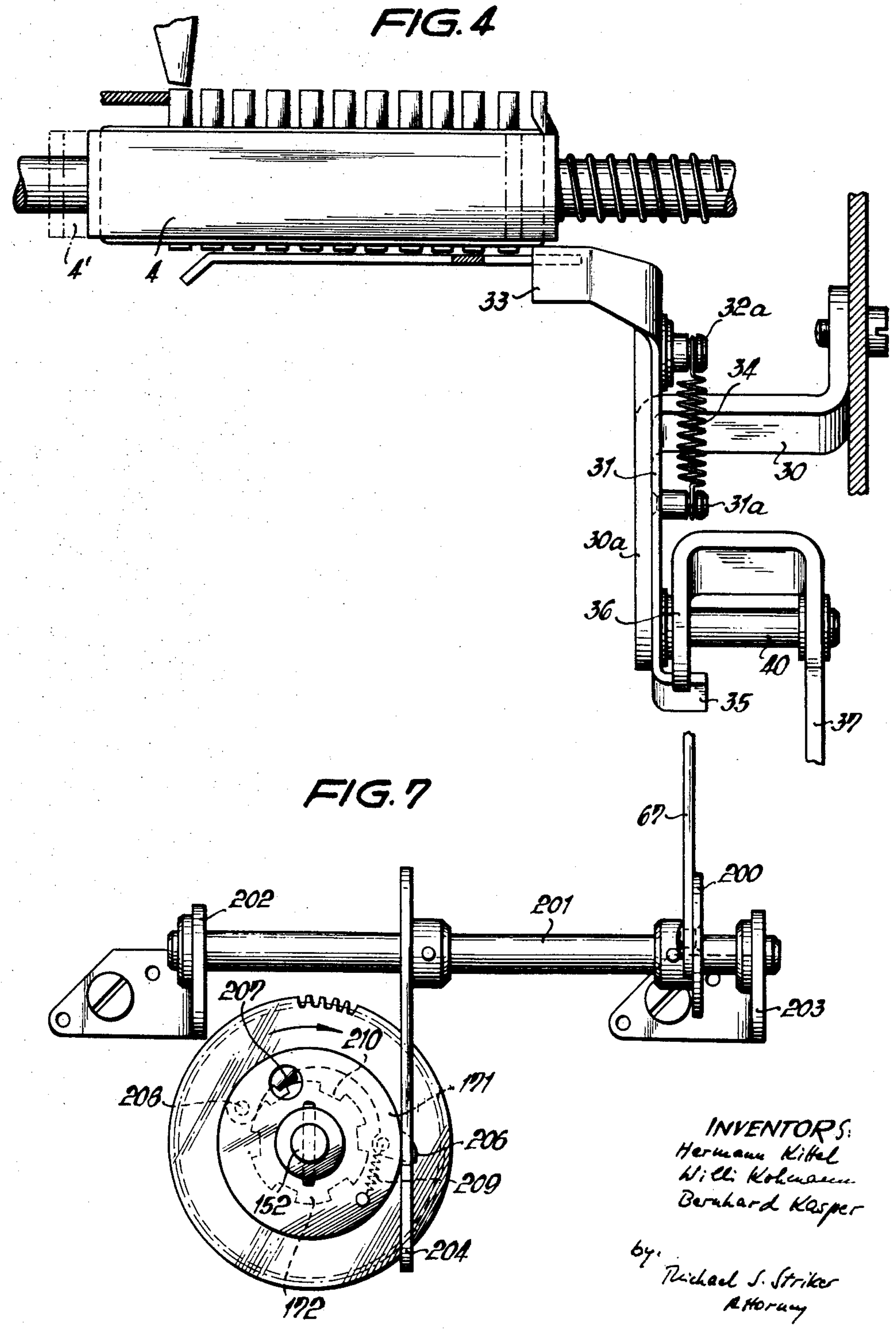
FIG. 4 is a fragmentary end view illustrating parts of the control arrangement shown in FIGS. 1 to 3.
FIG. 7 is an end view illustrating a constructive detail of the accounting machine shown in FIG. 1.

Shaft 152 carries a one-revolution clutch 152*a* which is also shown in FIG. 7. Clutch 152*a* includes a disc 170 fixed on shaft 152 and pivotally supporting a spring loaded coupling pawl 171 which tends to fall into a notch on coupling disc 172. Disc 172 is fixed to a sleeve 173 rotatably mounted on shaft 152 and supporting a fixed gear 174 which meshes with a pinion 152*b* on the shaft of motor 152*c*. When coupling pawl 171 is in coupling position, motor 152*c* drives shaft 152 through gears 152*b*, 174 and one revolution clutch 152*a*. As best seen in FIG. 7, a lever 200 is articulated to the lower end of a link 67 and secured to a shaft 201 to which another lever 204 is fixed which extends transverse to lever 200. Shaft 201 is supported by two support members 202 and 203. Lever 204 has a hook engaging a pawl end portion 206, and when link 67 is raised, lever 204 swings away from projection 206 and releases the same so that the main body of the coupling pawl 171 is drawn by spring 209 to turn about pin 208 to a position in which the projection 207 thereof falls into a notch 210 in coupling disc 172 which is fixed to sleeve 173. Coupling pawl 171 is normally in a disengaged position, but when link 67 is raised, as will be explained hereinafter, coupling pawl 171 is released and effects coupling of clutch 152*a* for a single revolution after which coupling pawl 171 is again disengaged by lever 204.

The paper carriage 2 supports in addition to a main control bridge 22, an auxiliary control bridge 23 on which tabs 24 can be set in selected positions along the length of the carriage so as to be associated with selected column positions of an account sheet located on the platen 2*a* of the paper carriage 2. Tabs 24 are operatively connected to stop levers 25 which are articulated to links 26 which effect displacement of levers 27 into a position located in the path of movement of stops 28 on a control unit 29, which controls the transporting means of the record card to be punched. The shaft of the control unit 29 is driven from shaft 152.

The control bridge 23 also carries tabs 24 which are operatively connected to the link 67 to effect, when operated, a marking or recording operation such as punching or printing.

The above described structure of an accounting machine is disclosed in the U.S. Patent No. 3,034,426, and is not an object of the present invention, but will facilitate the understanding of the structure and function of the control arrangement of the present invention, which is advantageously applied to a machine of this type.

A bracket 30 including a plate **30*a* is mounted on a fixed part of the machine, and slidably supports an operating member shown to be a slide 31 which has an elongated opening 32 through which a pin 32*a* passes, pin 32*a* being secured to plate 30*a*. A pin 40, also secured to plate 30*a* passes through a second elongated opening, not shown. Another pin 31*a* is secured to slide 31 and is connected by a spring 34 to pin 32*a* so that slide 31 is biased to assume a higher position in which its transverse portion 33 is located directly adjacent the pin carriage 4. Slide 31 has at its lower end a transverse blocking projection 35 which is located in the path of movement of a projecting part 36 of a link 37. Part 36 and the end portion of link 37 have aligned slots 38 through which the fixed pin 40 passes. The link 37 has in its middle portion another elongated opening 39 in which a fixed pin 41 is located. Pin 41 is secured to a rigid frame part 49. When a number is introduced into the pin carriage 4, the pin carriage is shifted one step to the left as viewed in FIG. 4 to the position 4′ so that the next following digit is introduced into the next higher order. Projection 33 of operating member 31 is located underneath the pin carriage 4 only in the initial normal position of the pin carriage in which the pin carriage remains if no number is introduced. Pin carriage 4 is raised and lowered to a transversely displaced position during each cycle of the accounting machine, and if pin carriage 4 is in the initial position shown in solid lines in FIG. 4, projection 33 of operating member or blocking slide 31 will be engaged by the pin carriage so that blocking projection 35 is displaced from the operating blocking position shown in FIG. 1, and shifted to an inoperative position shown in FIG. 2 in which it is no longer located in the path of movement of part 36 of link 37 so that the same is free to perform a longitudinal motion. However, when pin carriage 4 is displaced to a position 4′, the up and down movement of pin carriage 4 will have no effect on the blocking member 33, 31, 35, since the righthand end of the pin carriage is no longer located in the region of the projection 33 of the operating member 33, 31, 35. Due to the action of spring 34, operating member 33, 31, 35** will return to its blocking position as soon as the pin carriage is again raised.

Link 37 is loaded by a spring 48 which extends between the fixed pin 41 on the rigid frame part 49 and a pin 47 secured to link 37. Spring 48 biases link 37 to move to the right as viewed in FIGS. 1 and 3 so that link 37 moves to the right as soon as part 36 is released by blocking portion 35. Pin 47 is located in an elongated openings 47′ of a cam follower lever 42 which is mounted on a pivot means 43 for turning movement. The cam follower part 44 of lever 42 is urged by spring 48 against the peripheral cam track of a cam 45 which is fixed on the main actuating shaft 46 of the accounting machine and consequently performs a revolution during each operational cycle of the machine. In the initial position of the machine, cam follower 44 is on a raised cam track portion so that link 37 is held in the position shown in FIG. 1 in which part 36 is located behind blocking projection 35. When cam follower 44 engages the lower cam track portion of cam 45 in the position of FIG. 2, lever 42 performs a pivotal motion in counterclockwise direction and permits spring 48 to pull link 37 to the right. When the raised cam track portion again engages cam follower 44, link 37 is shifted to the left to its initial inoperative position in which it can be blocked by the blocking portion 35 of the blocking member 33, 31, 35.

The end portion 37′ of link 37 is connected by a pivot pin 50 to a lever 51 which has a bridge-shaped portion **51*a* with a yoke 51*b* turnably mounted on a shaft 52. Lever 51 has an arm with two projecting pins 53 and 54. Another bridge-shaped lever 56 is also turnably mounted on shaft 52 and has a leg 55 engaging pin 53. The two levers 51 and 56 are urged toward each other by a spring 54′ located between a pin 55′ on leg 55 and the pin 54 of lever 51. The leg 55 of lever 56 has a projecting pin 57 which is located in a slot 58 of a push rod 59**.

Push rod 59 is articulated to a bell crank lever 60 mounted on a fixed pin 61, whose cam follower 62 also engages the cam track of cam 45 in a position substantially diametrical to the position of cam follower 44. During rotation of cam 45, push rod 59 is actuated by actuating cam 45 to perform a reciprocating longitudinal movement. A spring 60′ retracts push rod 59 to the left as viewed in the drawing, and urges cam follower 62 against cam 45.

The end of push rod 59 has a coupling portion 59′ normally engaging a coupling pin 63 on an angular lever 64 and forming a coupling with the same. Lever 64 is turnably mounted on a shaft 65 and connected by a pivot means 66 to the link 67 by which the one-revolution clutch **152*a* is actuated, as explained above. The transmission linkage 60, 59, 59′, 64, 67 constitutes a connecting means between the cyclically operating control cam means 45 and the drive means 152*a*, 152*b*, 152*c*. The connecting means are disconnected when the coupling means 59′, 63, 64 is inoperative due to displacement of push rod 59**.

*Operation*

Figure 1B:
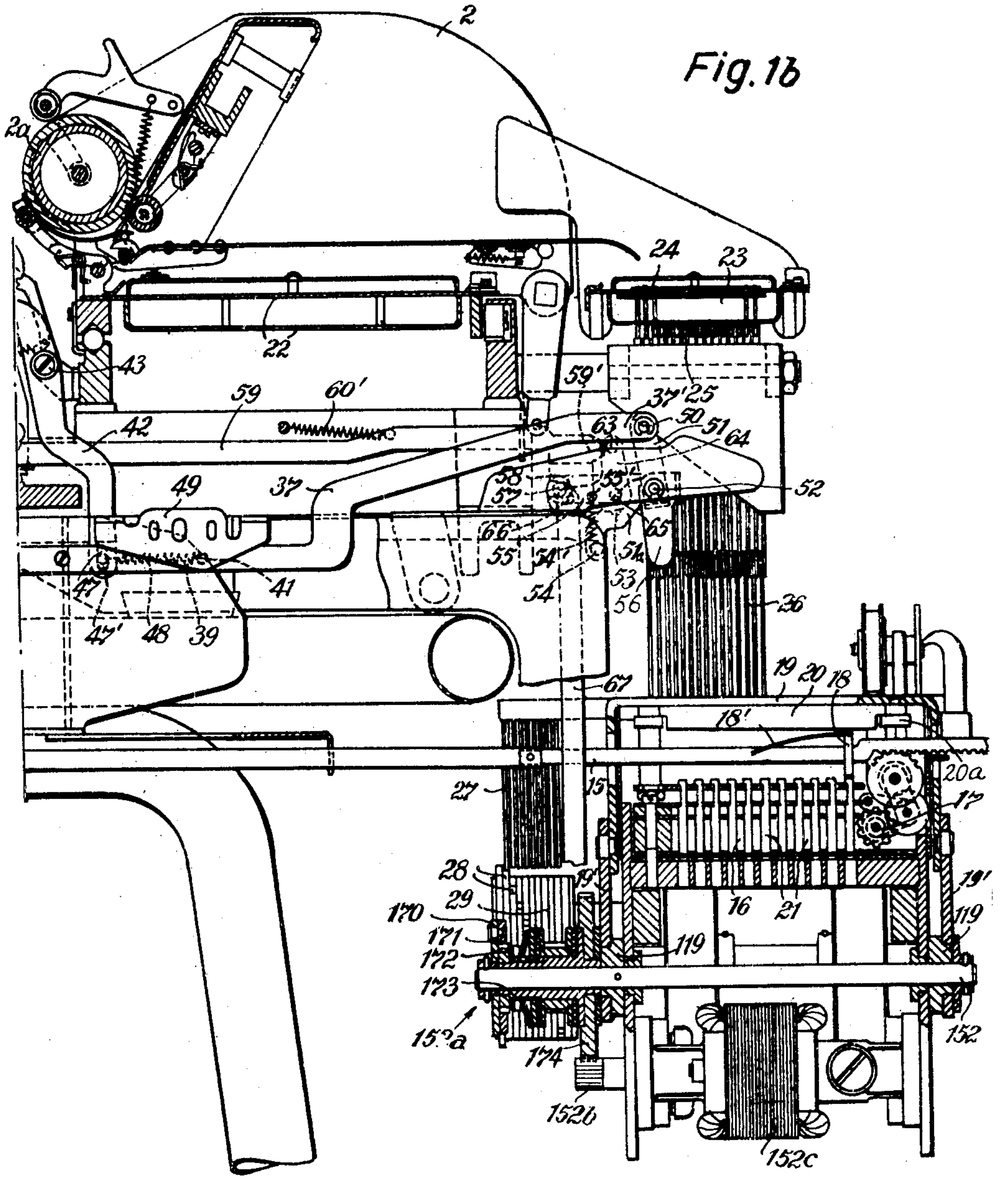
Figures 2A, 2B:
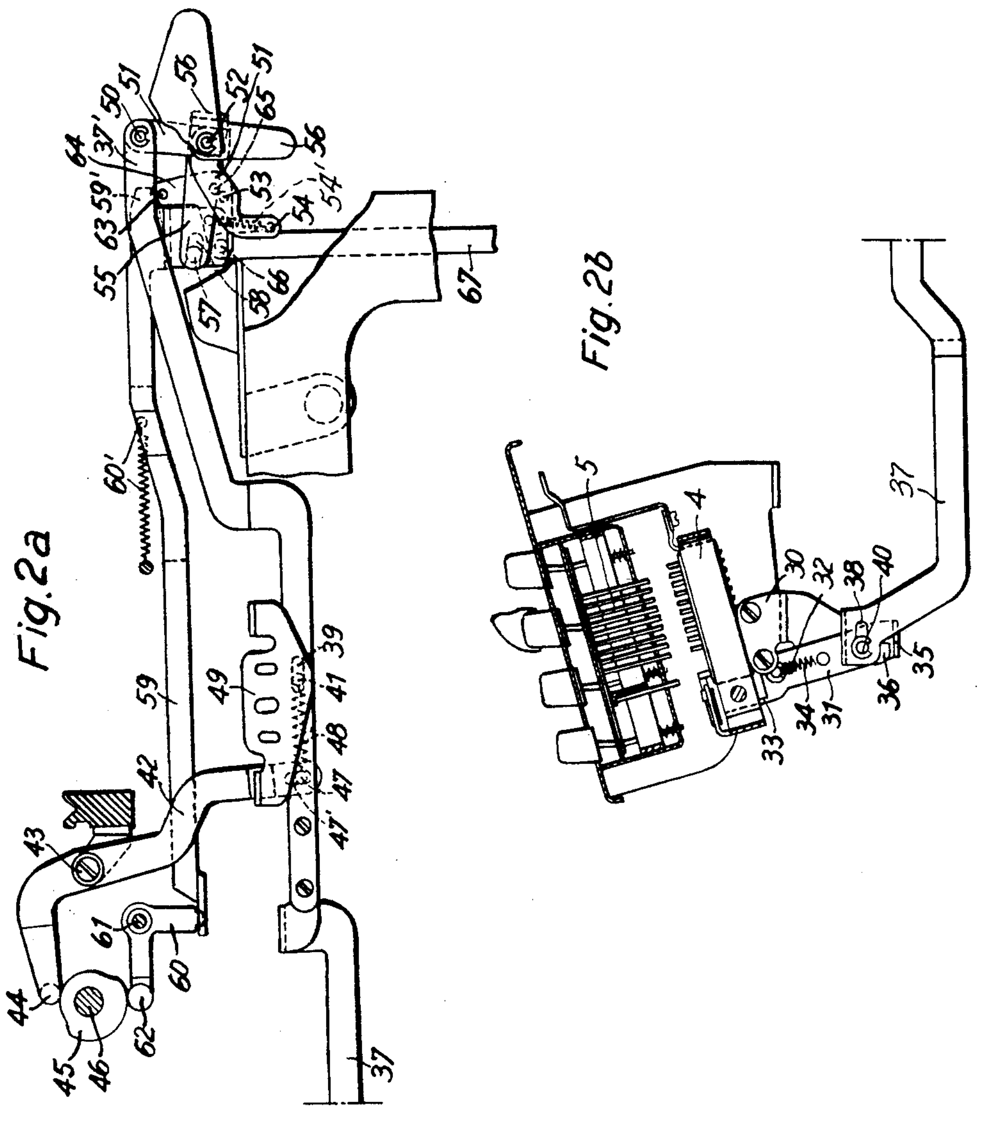
FIG. 2 is divided into FIGS. 2*a* and 2*b* and is a side elevation of the embodiment shown in FIG. 1 in an operational position which corresponds to an intermediate phase of the cycle, the main structure of the accounting machine being omitted for the sake of the clarity.
Figure 3A:
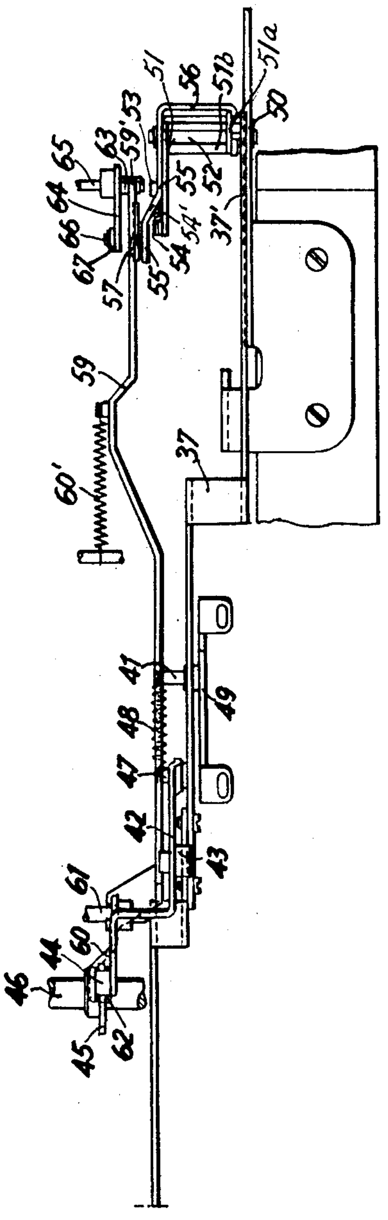
FIG. 3 is divided into FIGS. 3*a* and 3*b* which are the right and left parts of a plan view illustrating the control arrangement shown in FIG. 2.
Figure 3B:
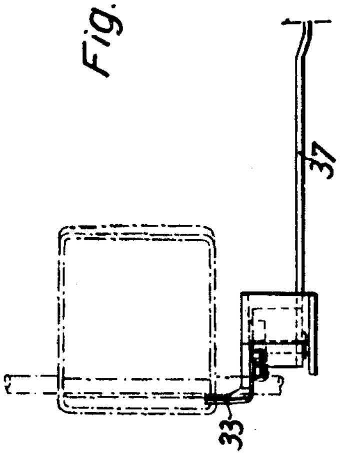

FIGS. 1*a* and 1*b* illustrate all elements of the control arrangement of the present invention in an initial normal position, while FIGS. 2*a* and 2*b* illustrate an intermediate phase of the cycle. Assuming that a numerical value has been introduced into the pin carriage 4 by operation of the keyboard 5, an operational cycle of the machine is started in a conventional manner. Actuating shaft 46 turns with actuating cam 45 and turns lever 60 so that push rod 59 is shifted to the right as viewed in the drawing and coupling portion 59′ engages the coupling pin 63 of lever 64 to transform the horizontal motion of push rod 59 into a vertical movement of link 67 by which the one revolution clutch **152*a* is rendered operative. The recording means 17, 19, 20, 18, 21 are operated by eccentric members 119 which turn with shaft 152 when the same is rotated by motor 152*c* through gears 152*b*, 174, sleeve 173, and the engaged one-revolution clutch 152*a*, the drive means for the recording or marking means. Consequently, a punching operation and a printing operation are performed on a card which was fed to a position located underneath the recording means 21, 17. In this manner, the card is punched and imprinted corresponding with the positions of rack bars 15 which correspond to the positions of slides 3 which sense the displaced pins of the carriage 4. The rack portions of the members 3 will set the printing means for the record carrying sheet on the platen 2*a* so that the same is imprinted with the same numbers which are recorded on the record card by the punching means 21 or printing means 17**.

During the first half of the above described operational cycle, the pin carriage performs a transverse down and up movement in a known manner. However, since a number was introduced into the pin carriage, pin carriage 4 has moved to the position 4′ in which it is no longer located above projection 33 of the operating member 33, 31, 35. Therefore, the downward movement of the pin carriage has no influence on the blocking means, since the pin carriage passes projecting portion 33. As a result, spring 48 cannot move link 37 to the right when cam follower 44 moves from the higher cam track portion of cam 45 to the lower cam track portion of cam 45. Thus, the control arrangement of the present invention is not operated during a normal operational cycle of the machine.

Assuming that the paper carriage 2 has stopped at an undesired column of the record sheet on the platen 2a, and that the operator decides to start an operational cycle of the machine by use of the motor key, the paper carriage 2 of the machine will move on to the next following column position, and then stop. This operational cycle takes place without the previous introduction of a number into the pin carriage 4. Consequently, pin carriage 4 is in its initial position shown in solid lines n FIG. 4 and extending into the region of the projecton 33 of operating and blocking member 33, 31, 35. The pins of the pin carriage represent the value zero, so that, if a recording operation would be performed at this time, the record card would be marked by punches 21 with holes representing zero. However, this is prevented by the arrangement of the present invention, since during the automatic downward movement of the pin carriage 4, projection 33 is engaged, and blocking projection 35 is shifted from the position shown in FIGS. 1*a* and 4 to the position shown in FIG. 2*b* in which projecting part 36 of link 37 is no longer located behind the blocking projection 35. Consequently, as soon as cam follower 44 moves to the lower cam track portion of actuating cam 45, link 37 is free to move to the right as viewed in the drawing under the action of spring 48 so that lever 51 performs an angular motion which is transmitted through pin 53 to lever 56 so that pin 57, moving in slot 58 of push rod 59, moves the same to an upper inoperative position in which its coupling projection 59' does not engage the coupling pin 63 of lever 64 when push rod 59 is shifted to the right by lever 60 under control of the higher cam track portion of cam 45 during the second part of the operational cycle illustrated in FIGS. 2*a* and 2*b*. Consequently, the control impulse provided by cam 45 to actuate the one-revolution clutch 152a of the drive means through the connecting transmission means between cam 45 and clutch 152a is rendered ineffective due to the disengaged inoperative positon of the coupling means 59' and 63.

If it is desired to print a zero in a column, it is only necessary to actuate the zero key of the machine which causes a movement of the pin carriage to the left as viewed in FIG. 4 so that its downward movement during the operational cycle of the machine has no influence on the blocking member 33, 31, 35. It is also contemplated to provide a control member on the control bridge 23 which is operatively connected to the support means of lever 64 to move the same to the inoperative position in which pin 63 is not engaged by coupling part 59'.

There are operational conditions possible in which no number is introduced into the pin carriage. For example, if a numerical value is to be transmitted from the storage register of the machine to the recording means, no value has to be introduced into the pin carriage. However, the control arrangement of the present invention will remain inoperative under these conditions, since the pin carriage will not perform a transverse downward and upward movement under these conditions, although the pin carriage remains in its initial position.

The embodiment described with reference to FIGS. 1 to 4 and 7 uses mechanical connecting means for connecting the control cam means 45 with the clutch means 152a. In the embodiment of the invention illustrated in FIGS. 5 and 6, cyclically operating control cam means control the drive of the recording means 21 by an electric circuit including switches.

Figures 5, 6:
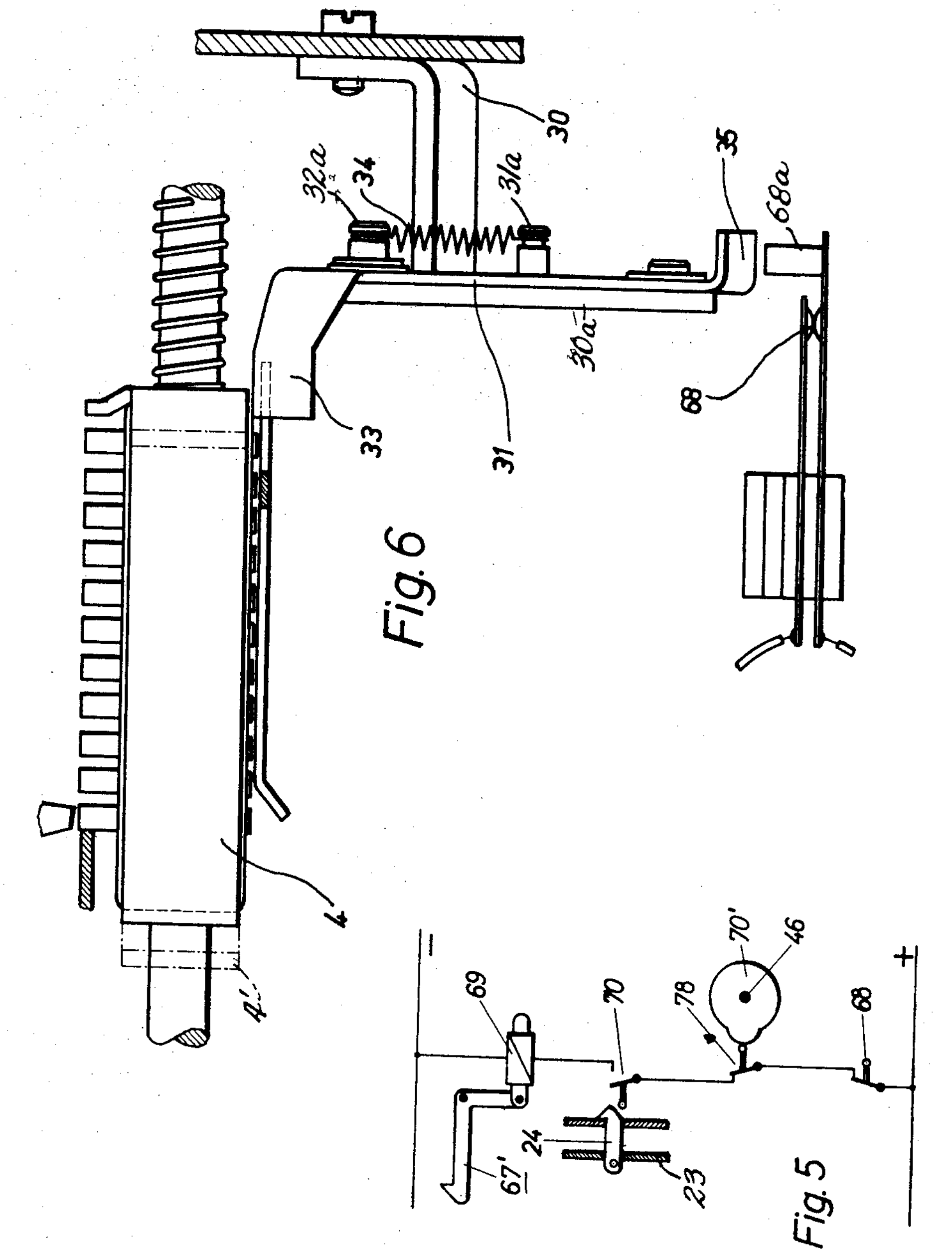
FIG. 5 is a fragmentary diagrammaitc view illustrating a modified embodiment of the present invention.
FIG. 6 is an end view illustrating parts of the embodiment shown in FIG. 5.

Referring first to FIG. 6, it will be seen that the pin carriage 4 is movable from the initial position shown in solid lines to a displaced position 4' shown in broken lines so that an operating member 33, 31, 35 shown to be a slide, is shifted only when the pin carriage performs transverse down and up movements in its initial position. It will be noted, that slide 33, 31, 35 is mounted in the same manner as the blocking slide described with reference to FIG. 4. When slide 33, 31, 35 is displaced by the pin carriage during an operational cycle, its projection 35 engages an insulating part 68a on a blocking switch 68 and opens the same. When pin carriage 4 is displaced to assume position 4' after introduction of a number, slide 33, 31, 35 is not shifted during the dip of the pin carriage, and consequently switch 68 remains in its normal closed position.

As shown in FIG. 5, the normally closed switch 68 is connected in series with another switch 78, and a third switch 70 which is normally open. An electromagnetic means 69 is connected in series with the three switches 68, 70 and 78 and effects an operation of the recording means by engaging the one revolution clutch 152a to which a movable part of electromagnetic means 69 is connected by a bellcrank linkage 67' corresponding to lever 204 shown in FIG. 7.

Whenever an impulse passes through the winding of electromagnetic means 69, the recording means is actuated. Switch 78 is a control switch cyclically operated by the engaged clutch 152a by the cyclically operating control means of the machine for example by a cam 70' on the main shaft 46 similar to cam 45. However, if blocking switch 68 is opened by the slide 33, 31, 35 under control of the pin carriage, no current can flow through the closed switch 78 whereby the operation of the recording means is prevented if the operational cycle has been started without introduction of a number into the pin carriage 4. Of course, if a number has been set in the pin carriage, then the pin carriage will be displaced, and will not open blocking switch 68 through slide 33, 31, 35 so that the circuit of the electromagnetic means 69 will be closed upon closing of control switch 78 and a recording operation will be carried out to punch and imprint the record carrier card with the numerical value introduced into the pin carriage.

The additional switch 70 is operated by a tab 24 on the control bridge 23 on the paper carriage 2, so that by opening of switch 70, a marking operation can be prevented, even if switch 68 remains closed due to a displacement of the pin carriage.

It will be understood that each of the elements described above or two or more together, may also find a useful application in other types of accounting machines differing from the types described above.

While the invention has been illustrated and described as embodied in a control arrangement for preventing the punching of undesired zero marks on a card during an idle operational cycle of an accounting machine, it is not intended to be limited to the details shown, since various modifications and structural changes may be made without departing in any way from the spirit of the present invention.

What is claimed and desired to be secured by Letters Patent is:

1. In an accounting machine, in combination, recording or marking means for marking a record carrier; drive means connected to said marking means for effecting marking operations of said marking means; cyclically operating control means; connecting means connecting said control means with said drive means and being movable between an inoperative position, and an operative position connecting said control means with said drive means for causing a marking operation; a pin carriage having an initial position and moving out of said initial position upon introduction of a numerical value, said pin carriage being operated to perform another transverse movement during each operation cycle of the machine and of said control means and engaging in said initial position said connecting means during said other transverse movement for moving said connecting means to said inoperative position so that said marking means is not operated during a cycle of the machine in which said pin carriage remains in said initial position because no value is introduced into said pin carriage while said connecting means remains in said operative position when said pin carriage performs said other movement after moving out of said initial position after introduction of a numerical value whereby said marking means is operated.

2. In an accounting machine, in combination, recording or marking means for marking a record carrier; drive means connected to said marking means for effecting marking operations of said marking means; cyclically operating control cam means; connecting means connecting said control means with said drive means and including mechanical means movable between an inoperative position, and an operative position connecting said control means with said drive means for causing a marking operation; a pin carriage having an initial position and moving out of said initial position upon introduction of a numerical value, said pin carriage being operated to perform another transverse movement during each operational cycle of the machine and of said control means and engaging in said initial position said connecting means during said other transverse movement for moving said mechanical means to said inoperative position so that said marking means is not operated during a cycle of the machine in which said pin carriage remains in said initial position because no value is introduced into said pin carriage while said mechanical means remains in said operative position when said pin carriage performs said other movement after moving out of said initial position after introduction of a numerical value whereby said marking means is operated.

3. In an accounting machine, in combination, recording or marking means for marking a record carrier; drive means connected to said marking means for effecting marking operations of said marking means; electromagnetic means for starting said drive means; cyclically operating control means including a cyclically opened and closed switch means connected to said electromagnetic means and having said switch means movable between a circuit-breaking inoperative position and a circuit-closing operative position for causing a marking operation when said switch means is in said circuit-closing position; a pin carriage having an initial position and moving out of said initial position upon introduction of a numerical value, said pin carriage being operated to perform another transverse movement during each operational cycle of the machine and of said actuating means and engaging in said initial position said switch means during said other transverse movement for moving said switch means to said circuit-breaking position so that said marking means is not operated during a cycle of the machine in which said pin carriage remains in said initial position because no value is introduced into said pin carriage while said switch means remains in said circuit-closing position when said pin carriage performs said other movement after moving out of said initial position after introduction of a numerical value whereby said marking means is operated.

4. In an accounting machine, in combination, recording or marking means for marking a record carrier; drive means connected to said marking means for effecting marking operations of said marking means; cyclically operating control means; connecting means connecting said control means with said drive means and including a coupling means movable between an inoperative position, and an operative position connecting said control means with said drive means for causing a marking operation, said control means tending to move to said inoperative position, and blocking means having an inoperative position and a normal operating position for blocking movement of said coupling means to said inoperative position; a pin carriage having an initial position and moving out of said initial position upon introduction of a numerical value, said pin carriage being operated to perform another transverse movement during each operational cycle of the machine and of said control means and engaging in said intial position said blocking means during said other transverse movement for moving said blocking means to said inoperative position so that said coupling means moves to said inoperative position and said marking means is not operated during a cycle of the machine in which said pin carriage remains in said initial position because no value is introduced into said pin carriage while said blocking means remains in said operative position when said pin carriage performs said other movement after moving out of said initial position after introduction of a numerical value whereby said marking means is operated.

5. In an accounting machine, in combination, recording or marking means for marking a record carrier; control means connected to said marking means for effecting a marking operation of said marking means; cyclically operating control means; transmission means connecting said control means with said moving means and including coupling means movable between an inoperative position and an operative coupling position connecting said control means with said drive means, biasing means for biasing said coupling means to move to said inoperative position, means controlled by said control means and operatively connected to said coupling means to return the same to said coupling position at the end of each operating cycle, and blocking means having an inoperative position and a normal operative position for blocking movement of said coupling means to said inoperative position, said blocking means being biased to move to said operative position; and a pin carriage having an initial zero position and moving out of said initial position upon introduction of a numerical value, said pin carriage being operated to perform another transverse movement during each operational cycle of the machine and of said actuating means and engaging in said initial position said blocking means during said other transverse movement for moving said blocking means to said inoperative position so that said coupling means moves to said inoperative position and said marking means is not operated during a cycle of the machine in which said pin carriage remains in said initial position because no value is introduced into said pin carriage while said blocking means remains in said operative position when said pin carriage performs said other movement after moving out of said initial position after introduction of a numerical value whereby said marking means is operated.

6. In an accounting machine, in combination, recording or marking means for marking a record carrier; drive means connected to said marking means for effecting a marking operation of said marking means; cyclically operating control cam means; transmission means connecting said control means with said drive means and including coupling means movable between an inoperative position and an operative coupling position connecting said control means with said drive means, said coupling means including a reciprocating push bar controlled by said cam means, a pivoted member connected to said drive means, means supporting said push bar for movement between an operative coupling position in which said pivoted member is located in the path of movement of said push bar, and an inoperative position, and a link connected to said supporting means; biasing means for biasing said link to move said push bar to said inoperative position so that said coupling means is in said inoperative position; means controlled by said control means and operatively connected to said link to return said push bar to said operative coupling position at the end of each operating cycle; blocking means having an inoperative position and a normal operating position for blocking movement of said link with said push bar to said inoperative position, said blocking means being biased to move to said operative position; and a pin carriage having an initial zero position and moving out of said initial position upon introduction of a numerical value, said pin carriage being operated to perform another transverse movement during each operational cycle of the machine and of said actuating cam means and engaging in said initial position said blocking means during said other transverse movement for moving said blocking means to said inoperative position so that said coupling means moves to said inoperative position and said marking means is not operated during a cycle of the machine in which said pin carriage remains in said initial position because no value is introduced into said pin carriage while said blocking means remains in said operative position when said pin carriage performs said other movement after moving out of said initial position after introduction of a numerical value whereby said marking means is operated.

7. In an accounting machine, in combination, recording or marking means for marking a record carrier; drive means connected to said marking means for effecting a marking operation of said marking means and including a motor having a shaft, and a one-revolution clutch connecting said shaft with said marking means; cyclically operating control cam means; transmission means connecting said control cam means with said one-revolution clutch for rendering the same operative at a selected moment of an operational cycle, and including coupling means movable between an inoperative position and an operative coupling position, said coupling means including a reciprocating push bar controlled by said cam means, a pivoted member, and a clutch control member connected to said pivoted member, means supporting said push bar for movement between an operative coupling position located in the path of movement of said push bar, and an inoperative position, and a link connected to said supporting means; biasing means for biasing said link to move said push bar to said inoperative position so that said coupling means is in said inoperative position; means controlled by said control cam means and operatively connected to said link to return said push bar to said operative coupling position at the end of each operating cycle; blocking means having an inoperative position and a normal operative position for blocking movement of said link with said push bar to said inoperative position, said blocking means being biased to move to said operative position; and a pin carriage having an initial zero position and moving out of said initial position upon introduction of a numerical value, said pin carriage being operated to perform another transverse movement during each operational cycle of the machine and of said operative cam means and engaging in said initial position said blocking means during said other transverse movement for moving said blocking means to said inoperative position so that said coupling means moves to said inoperative position and said marking means is not operated during a cycle of the machine in which said pin carriage remains in said initial position because no value is introduced into said pin carriage while said blocking means remains in said operative position when said pin carriage performs said other movement after moving out of said initial position after introduction of a numerical value whereby said marking means is operated.

8. An arrangement as set forth in claim 7 wherein said blocking means includes a slide mounted for movement in the direction of said transverse movement of said pin carriage and having a portion located in the path of the transverse movement of said pin carriage when the same is in its initial zero position; and a spring biasing said slide to move to a blocking position located in the path of said link.

9. In an accounting machine, in combination, recording or marking means for marking a record carrier; drive means for said marking means and including a one revolution clutch means; electromagnetic means operatively connected to said clutch means for starting marking operations of said marking means; cyclically operating control means; a circuit connected to said electromagnetic means and having a control switch operated by said control means to move between an inoperative open position and a closed position for energizing said electromagnetic means and biased to move to said open position, and a blocking switch in series with said control switch and having a normal closed position; a spring-loaded slide for operating said blocking switch and being biased to assume an inoperative position and having an operative position for moving said blocking switch to said open position; and a pin carriage having an initial zero position and moving out of said initial position upon introduction of a numerical value, said pin carriage being operated to perform another transverse movement during each operational cycle of the machine and of said actuating means and engaging in said initial position said spring-loaded slide during said other transverse movement for moving said blocking switch to its open position so that the circuit of said electro-magnetic means is interrupted and said marking means is not operated during a cycle of the machine in which said pin carriage remains in said initial position because no value is introduced into said pin carriage while said blocking switch remains in said normal closed postion when said pin carriage performs said other movement after moving out of said initial position after introduction of a numerical value whereby said marking means is operated.

10. In an accounting machine, in combination, recording or marking means for marking a record carrier; drive means for said marking means and including a one revolution clutch means; electromagnetic means operatively connected to said clutch means for starting marking operations of said marking means; cyclically operating control means; a main carriage for supporting record sheets; a circuit connected to said electro-magnetic means and having a control switch operated by said control means to move between an inoperative open position and a closed position for energizing said electromagnetic means, and biased to move to said open position, another switch in series with said control switch and operated by said main carriage, and a blocking switch in series with said control switch and having a normal closed position; a spring-loaded slide for operating said blocking switch and being biased to assume an inoperative position and having an operative position for moving said blocking switch to said open position; and a pin carriage having an initial zero position and moving out of said initial position upon introduction of a numerical value, said pin carriage being operated to perform another transverse movement during each operational cycle of the machine and of said control means and engaging in said initial position said spring-loaded slide during said other transverse movement for moving said blocking switch to its open position so that the circuit of said moving means is interrupted and said marking means is not operated during a cycle of the machine in which said pin carriage remains in said initial position because no value is introduced into said pin carriage while said blocking switch remains in said normal closed position when said pin carriage performs said other movement after moving out of said initial position after introduction of a numerical value whereby said marking means is operated.

11. In an accounting machine, a pin carriage having an initial position and movable from said initial position in one direction to other positions and adapted to move from said initial and said other positions in a transverse direction into transversely displaced positions; recording means for recording on a record carrier; cyclically operating drive means tending to cyclically operate said recording means; and motion transmitting means associated on the one hand with said pin carriage and on the other hand with said cyclically operating drive means for operating said recording means by said cyclically operating drive means only when said pin carraige is moved from one of said other positions into the respective transversely displaced position thereof, so that said drive means do not operate said recording means when said pin carriage is moved from said initial position into the respective transversely displaced position thereof.

12. In an accounting machine, a pin carriage having an initial position and movable from said initial position in one direction to other positions and adapted to move from said initial and said other positions in a transverse direction into transversely displaced positions; recording means for recording on a record carrier; cyclically operating drive means tending to cyclically operate said recording means; and control means associated on the one hand with said pin carriage and on the other hand with said cyclically operating drive means for preventing said cyclically operating drive means from operating said recording means only when said pin carriage is moved from said initial position into the respective transversely displaced position thereof, while permitting said cyclically operating drive means to operate said recording means when said pin carriage is moved from one of said other positions into the respective transversely displaced position thereof.

13. In an accounting machine, a pin carriage having an initial position and movable from said initial position in one direction to other positions and adapted to move from said initial and said other positions in a transverse direction into transversely displaced positions; recording means for recording on a record carrier; cyclically operating drive means tending to cyclically operate said recording means; connecting means forming part of said drive means and movable between a connecting position in which said drive means is in driving connection with said recording means and a disconnecting position in which said drive means is out of driving connection with said recording means; and control means actuated by said pin carriage and operatively connected with said connecting means for moving the same between said positions in such a manner that said connecting means is out of said connecting position whenever said pin carriage is in said initial position during operation of said drive means, and is moved from said initial position into the respective transversely displaced position thereof, and is in said connecting position whenever said pin carriage is moved from one of said other positions into the corresponding transversely displaced position thereof.

14. In an accounting machine, a pin carriage having an initial position and movable from said initial position in one direction to other positions and adapted to move from said initial and said other positions in a transverse direction into transversely displaced positions; recording means for recording on a record carrier; cyclically operating means tending to cyclically operate said recording means and including a rotary cam, cam follower means, a drive member, an actuating member for said drive member, and a coupling means for connecting said actuating member with said cam follower means; and control means associated on the one hand with said pin carriage and including a movable operating member located in the path of movement of said pin carriage from said initial position in said transverse direction to said displaced position, and on the other hand with said coupling means for engaging said coupling means only when said pin carriage is moved from one of said other positions into the respective transversely displaced position thereof and for disengaging said coupling means when said pin carriage is moved from said initial position into the respective transversely displaced position thereof and said operating member is displaced by said pin carriage.

15. In an accounting machine, a pin carriage having an initial position and movable from said initial position in one direction to other positions and adapted to move from said initial and said other positions in a transverse direction into transversely displaced positions; recording means for recording on a record carrier; cyclically operating drive means tending to cyclically operate said recording means and including a rotary cam, a cam controlled switch, a drive member, an electro-magnetic means for starting said drive member and connected in series with said cam controlled switch, and a control switch for connecting said electro-magnetic means with said cam-controlled switch and with a voltage source; and control means associated on the one hand with said pin carriage and including a movable operating member located in the path of movement of said pin carriage from said initial position in said transverse direction to said displaced position, and on the other hand with said control switch for energizing said electromagnetic means only when said pin carriage is moved from one of said other positions into the respective transversely displaced position thereof and for disconnecting said electromagnetic means from the voltage source by opening said control switch when said pin carriage is moved from said initial position to said displaced position thereof and said operating member is displaced by said pin carriage.

16. In an accounting machine, in combination, recording means for recording on a record carrier; drive means having an operative condition connected to said recording means for operating the same, and a normal inoperative condition; cyclically operating means; connecting means having a connecting position for connecting said cyclically operating means with said drive means so that said cyclically operating means cyclically places said drive means in said operative position, and a disconnecting position in which said drive means remains in said inoperative position; a pin carriage having an initial position and moving in one direction out of said initial position upon introduction of a numerical value, said pin carriage being cyclically operated to perform a movement transverse to said direction to a transversely displaced position during each operational cycle of the machine and of said cyclically operating means; and an operating member movable to an actuating position for moving said connecting means to said disconnecting position, said operating member being located in the path of movement of said pin carriage from said initial position in said transverse direction to said transversely displaced position so as to be moved by the same to said actuating position when the same moves from said initial position to said transversely displaced position whereby said drive means remains in said inoperative position so that said recording means are not operated during a cycle of the machine in which said pin carriage remains in said initial position, said pin carriage moving away from said operating member when moving out of said initial position so that said connecting means remains in said connecting position when said pin carriage performs said transverse movement after moving out of said initial position due to the entry of a numerical value whereby said recording means is operated by said drive means.

17. In an accounting machine, in combination, recording means for recording on a record carrier; drive means having an operative condition connected to said recording means for operating the same, and a normal inoperative condition; cyclically operating means; connecting means including coupling means having a connecting position for connecting said cyclically operating means with said drive means so that said cyclically operating means cyclically places said drive means in said operative position, and a disconnecting position in which said drive means remains in said inoperative position; a pin carriage having an initial position and moving in one direction out of said initial position upon introduction of a numerical value, said pin carriage being cyclically operated to perform a movement transverse to said direction to a transversely displaced position during each operational cycle of the machine and of said cyclically operating means; and an operating member movable to an actuating position for moving said coupling means to said disconnecting position, said operating member being located in the path of movement of said pin carriage from said initial position in said transverse direction to said transversely displaced position so as to be moved by the same to said actuating position when the same moves from said initial position to said transversely displaced position whereby said drive means remains in said inoperative position so that said recording means are not operated during a cycle of the machine in which said pin carriage remains in said initial position, said pin carriage moving away from said operating member when moving out of said initial position so that said coupling means remains in said connecting position when said pin carriage performs said transverse movement after moving out of said initial position due to the entry of a numerical value whereby said recording means is operated by said drive means.

18. In an accounting machine, in combination, recording means for recording on a record carrier; drive means having an operative condition connected to said recording means for operating the same, and a normal inoperative condition; cyclically operating means; an electromagnetic means for placing said drive means in said operative condition; a switch cyclically operated by said cyclically operating means; a control switch connected in series with said switch and said electro-magnetic means and having a connecting position for connecting the same to a source of voltage and a disconnecting position; a pin carriage having an initial position and moving in one direction out of said initial position upon introduction of a numerical value, said pin carriage being cyclically operated to perform a movement transverse to said direction to a transversely displaced position during each operational cycle of the machine and of said cyclically operating means; and an operating member movable to an actuating position for moving said control switch to said disconnecting position, said operating member being located in the path of movement of said pin carriage from said initial position in said transverse direction to said transversely displaced position so as to be moved by the same to said actuating position when the same moves to said transversely displaced position whereby said electro-magnetic means is de-energized by said control switch in said disconnecting position so that said drive means remains in said inoperative position and said recording means are not operated during a cycle of the machine in which said pin carriage remains in said initial position, said pin carriage moving away from said operating member when moving out of sad initial position so that said control switch remains in said connecting position when said pin carriage performs said transverse movement after moving out of said initial position due to the entry of a numerical value whereby said recording means is operated by said drive means.

References Cited in the file of this patent

UNITED STATES PATENTS

| | | |
|---|---|---|
| 2,014,560 | Dysart | Sept. 17, 1935 |
| 2,545,636 | Sundstrand | Mar. 20, 1951 |
| 2,795,375 | Esdale | June 11, 1957 |
| 2,931,564 | Christian et al. | Apr. 5, 1960 |
| 2,998,914 | Thomas et al. | Sept. 5, 1961 |

FOREIGN PATENTS

| | | |
|---|---|---|
| 844,501 | Great Britain | Aug. 10, 1960 |